United States Patent [19]

Moss

[11] Patent Number: 4,871,183

[45] Date of Patent: Oct. 3, 1989

[54] TRAILER DOLLY

[75] Inventor: Randy L. Moss, Cherryville, N.C.

[73] Assignee: Moss Metal Fabrications, Cherryville, N.C.

[21] Appl. No.: 13,753

[22] Filed: Feb. 12, 1987

[51] Int. Cl.$^4$ .............................................. B60S 9/02
[52] U.S. Cl. .................................... 280/475; 254/418; 254/424; 280/763.1
[58] Field of Search ............... 280/400, 433, 462, 463, 280/475, 763.1, 427–431; 254/418, 419, 420, 421, 422, 424, 425, 475

[56] References Cited

U.S. PATENT DOCUMENTS

| | | | |
|---|---|---|---|
| 2,853,316 | 9/1958 | Moss | 280/475 |
| 3,314,692 | 4/1967 | Karns | 280/475 |
| 3,348,860 | 10/1967 | Buckles | 280/475 |
| 3,614,064 | 10/1971 | Bennett | 254/418 |
| 3,841,663 | 10/1974 | Proffit | 280/475 |
| 3,869,149 | 3/1975 | Dixon | 280/475 |
| 4,589,632 | 5/1986 | Smith | 254/418 |

FOREIGN PATENT DOCUMENTS 837511 6/1960 United Kingdom ................ 254/424

Primary Examiner—Charles A. Marmor
Assistant Examiner—Mitchell J. Hill
Attorney, Agent, or Firm—James B. Hinson

[57] ABSTRACT

The invention provide an improved trailer dolly and an improved trailer dolly tongue support jack. More specifically, the invention provides a trailer dolly which includes a tongue support jack which is effective and convenient to operate. In the preferred embodiment, the improved dolly includes a tongue support assembly permits the dolly tongue jack to be rotated between and automatically locked in the tongue support positions and the trailer use positions. Although the tongue jack was developed primarily for use with trailer dollys it can be used to support conventional trailer tongues and similar uses.

2 Claims, 2 Drawing Sheets

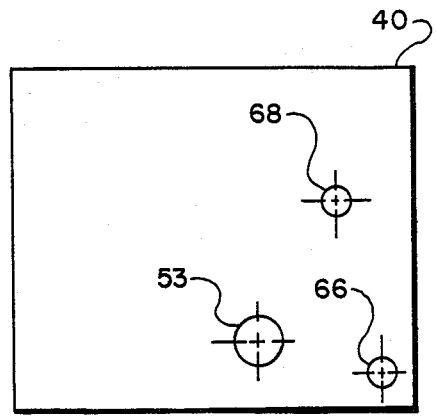
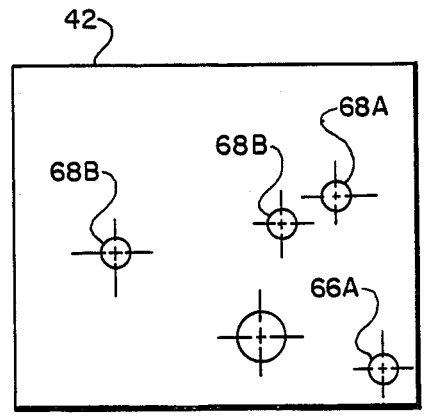
Fig. 5
Fig. 6
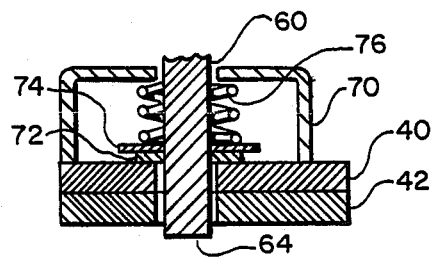
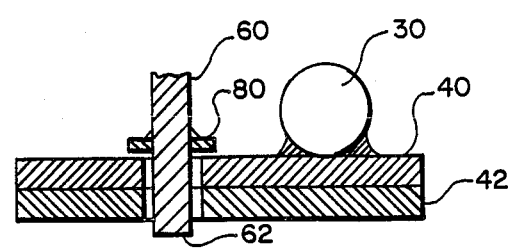
Fig. 7
Fig. 8
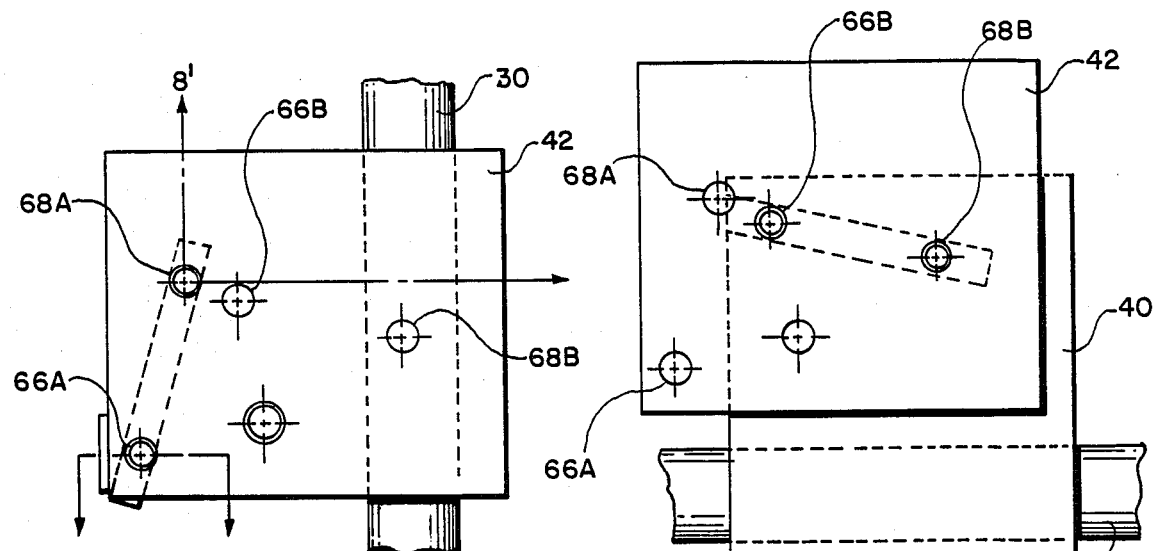
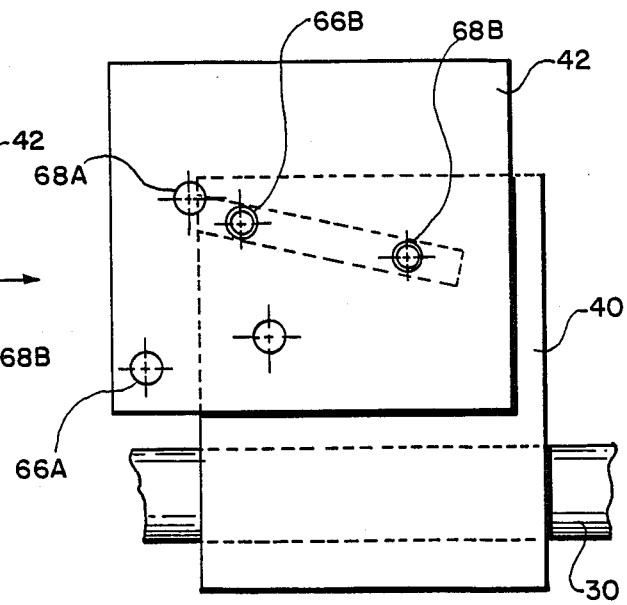
Fig. 9
Fig. 10

TRAILER DOLLY

BACKGROUND OF THE INVENTION

1. Field Of The Invention

The invention relates to transportation vehicles and more specifically to an improved dolly for use with multiple bottom trailers

2. Description Of The Prior Art

The development of multiple bottom trailers requires the use of a dolly to support the front end of the second and subsequent trailers. Multiple bottom trailers in the context of this patent application means an arrangement in which a single tractor is used to tow two or more trailers.

Additionally, the development of multiple bottom trailers further complicates the concerns associated with maneuvering such vehicles in relatively confined spaces. These difficulties are primarily associated with the inability of the multiple bottom trailers to be steered as they are propelled backwards. These characteristics makes it necessary to frequently decouple the second and subsequent trailers from the tractor permitting each of the trailers to be moved individually.

Typically, trailer dollys have utilized only one axle and when the dolly was disconnected from the tow bar, the tongue of the dolly rotated about the axle and contacted the ground. This created considerable inconvenience in that typically the tongue weight of the dolly is in the neighborhood of 200 pounds. In order to reattach the dolly to the draw bar it was necessary to raise and support the tongue of the dolly while the towing vehicle and the dolly were being coupled together.

A typical prior art trailer dolly utilized a tongue jack attached to the frame of the trailer dolly. The tongue jack was manually positioned up and down along a fixed path to position the tongue jack in the tongue support and in the trailer use positions. Such tongue jacks must be designed to provide sufficient operating range to conveniently clear obstacles routinely encountered by such trailers and to support the tongue of the dolly in the desired position. Even if the prior art tongue jacks are designed to provide sufficient operating range, they are inconvenient to use in that a typical prior art tongue jack required considerable manual effort to move it between the trailer use and the dolly tongue support positions.

No prior art search was made prior to preparing this patent application. The above description of the prior art is based on information provided by the inventor.

SUMMARY OF THE INVENTION

The invention provides an improved trailer dolly which includes an improved tongue support assembly. The tongue support assembly includes a tongue support jack which is rotatable between the tongue support and trailer use positions. Rotation of the tongue support assembly between the tongue support and trailer use positions provides sufficient road clearance for the tongue jack without requiring excessive manual adjustment of the tongue jack. More specifically, the tongue jack is rotatable through approximately ninety degrees to position the tongue jack substantially vertical when in the dolly tongue support position to substantially horizontal when in the trailer use position. In the tongue support position, the tongue jack is manually adjusted to the length required to support the dolly tongue in the desired position. A wheel is attached to the lower end of the tongue jack permitting the dolly to be easily moved when the dolly tongue is supported by the tongue jack. In the trailer use position, the diameter of this wheel primarily determines the clearance between the dolly tongue and the ground.

These characteristics are conveniently provided by a tongue support assembly attached to the tongue of the dolly which includes rotation means permitting the tongue jack to be selectively positioned in the trailer use and in the tongue support positions. More specifically, the tongue support assembly includes a tongue jack mounting plate to which the tongue support jack is attached. An attachment plate is welded to the frame of the dolly and rotatably coupled to the tongue jack mounting plate. Each of the plates includes a plurality of holes which selectively move into coincidence as the tongue jack is moved into either the tongue support or the trailer use positions. Spring loaded latch means automatically engage coinciding holes in the tongue jack mounting plate and the attachment plate to secure the tongue jack in the tongue support and use positions.

To move the tongue jack between the tongue support and trailer use positions, the latching means is manually held in the disengaged position as the tongue jack is rotated to position the tongue jack mounting plate and the attachment plates such that the attachment plate holds the latching means in the disengaged position. With the latching means held in the disengaged position, the tongue jack is further rotated until the automatic latching means engages to secure the tongue jack in the desired position.

OBJECTS OF THE INVENTION

It is the principal object of the invention to provide an improved trailer dolly.

It is another object of the invention to provide a trailer dolly tongue support device, which is convenient to operate and having improved road clearance.

It is another object of the invention to provide a trailer dolly tongue support device in which the road clearance is determined by rotating the dolly tongue jack between the tongue support and the trailer use positions.

DESCRIPTIONS OF THE DRAWINGS

FIG. 5 is a front view of the trailer dolly tongue jack mounting plate.

FIG. 6 is a front view of the trailer dolly tongue support attachment plate.

FIG. 7 is a view along line 7' of FIG. 9, illustrating the U-shaped bracket, the latching device and the latching spring.

FIG. 8 is a view along line 8' of FIG. 9, illustrating one end of the latching device and the attachment of the dolly tongue jack to the tongue jack mounting plate.

FIG. 9 is a back view of the tongue support assembly in the tongue support position.

FIG. 10 is a back view of the tongue support assembly in the trailer use position.

DETAILED DESCRIPTION

The invention provides a trailer dolly including means for supporting the dolly tongue at a convenient height when the dolly is decoupled from the towing vehicle. More specifically, the improved trailer dolly includes a tongue support assembly operable to rotate a dolly tongue support jack between vertical and horizontal positions. When in the vertical position the dolly tongue support jack is adjusted to position a support wheel attached to the lower end of the dolly tongue support jack such that this wheel contacts the road and supports the dolly tongue at the desired height. When the dolly is to be towed, the support assembly is unlatched and the dolly tongue support jack rotated to the horizontal position. This position provides sufficient clearance between the tongue support assembly. Little or no adjustment of the tongue support jack is required for purposes of providing road clearance.

The point about which the support assembly rotates and the other design features of the support assembly are selected such that sufficient road clearance is provided to clear obstacles normally encountered as the dolly is used. Specifically, the road clearance is primarily determined by the vertical position of the point about which the dolly tongue support assembly rotates, as specifically described below. Other factors which determine the road clearance include the dimensions of the support assembly in a direction perpendicular to the major axis of the dolly tongue support jack.

Figure 1:
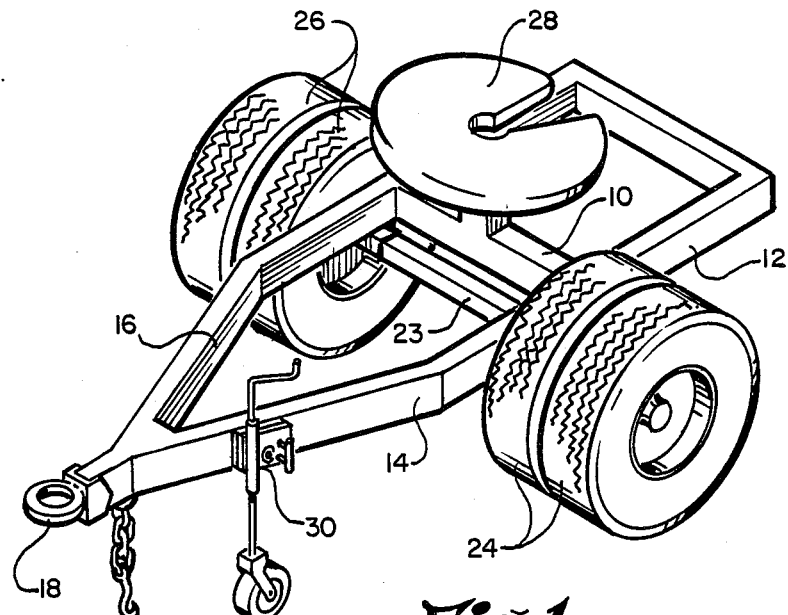
FIG. 1 is a drawing illustrating the improved trailer dolly comprising the invention.
Figure 2:
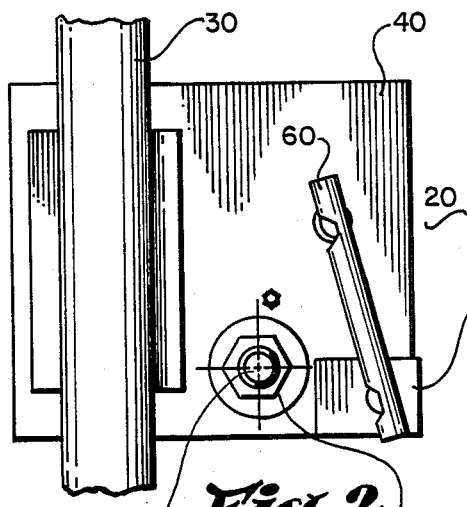
FIG. 2 is a front view of the trailer dolly tongue support assembly.

The preferred embodiment of the improved trailer dolly comprising the invention is illustrated in FIG. 1. The improved dolly includes a wheel and axle assembly which is attached to a frame assembly 12 of the trailer dolly. The frame assembly 12 includes two forward extending members 14 and 16 which join and are attached to a conventional hitch 18. In the illustrated embodiment, the tongue support assembly 20 (FIG. 2) is attached to the forwardly extending member 14 of the frame of the trailer dolly. Pairs of dual wheels 24 and 26 are supported on opposite ends of the axle 23 in a conventional manner. As is conventional, a fifth wheel 28 is provided for supporting the trailer to be towed by the trailer dolly.

The tongue support assembly includes a tongue jack 30 and means for attaching the tongue jack 30 to the dolly tongue such that the tongue jack 30 is selectively rotatable between the tongue support position and the trailer use position. More specifically, the means for attaching the tongue jack 30 to the trailer dolly includes a tongue jack mounting plate 40 and an attachment plate 42. In the preferred embodiment the attachment plate 42 is positioned adjacent to the member 14 of the frame 12 and welded thereto. Suitable means is provided to mount the tongue jack mounting plate 40 with respect to the attachment plate 42 such that they may be selectively rotated with respect to each other about an axis 46 (FIG. 3).

In the preferred embodiment a conventional bolt 48 extends through a hole in the attachment plate 42 and is welded in position as illustrated at reference numerals 50 and 52. The bolt 48 also extends through a hole in the tongue jack mounting plate 40. A washer 54 and a nut 56 hold the tongue jack mounting plate 40 and the attachment plate 42 in the mated position.

A latching device 60 cooperates with the tongue jack mounting plate member 40 and the attachment plate 42 such that these plates can be selectively rotated with respect to each other and held in at least first and second fixed positions with respect to each other by the latching device 60. More specifically, when the tongue support assembly is in the tongue support position, end portions 62 and 64 of the latching device 60 extend through openings 66 and 68 of the tongue jack mounting plate 40 and into mating opening 66A and 68A of the attachment plate 42. Similarly, when the tongue support assembly is rotated into the use position, the end portions 62 and 64 of the latching device 60 extend through openings 66 and 68 in the tongue mounting plate 40 and into corresponding openings to openings 66B and 68B in the attachment plate 42.

Figure 3:
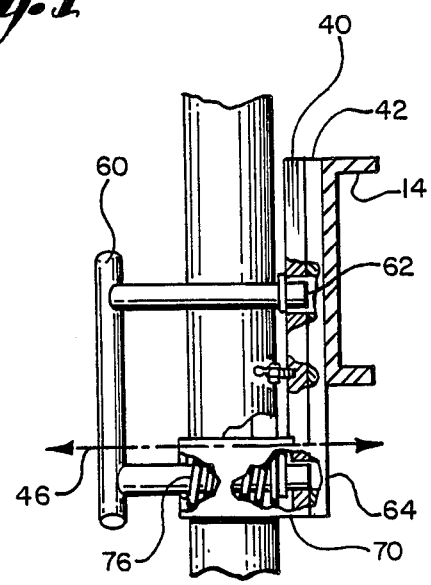
FIG. 3 is a side view of the trailer dolly tongue support assembly.
Figure 4:
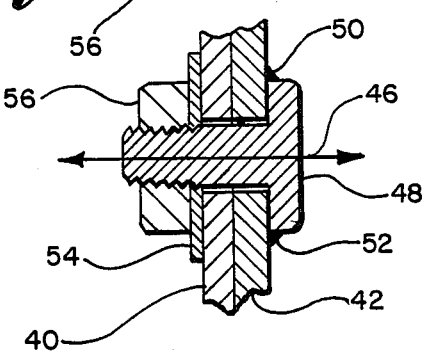
FIG. 4 is a partial drawing illustrating the rotary coupling which permits the trailer dolly tongue jack to be rotated between the trailer dolly tongue support and trailer use positions.

A convenient embodiment of the latching device 60 is further illustrated in FIG. 3 and comprises a generally "U-shaped" member having two substantially parallel extending ends 62 and 64. These ends extend through the first plate 40 and second plate 42 to hold them in a fixed position with respect to each other, as previously discussed. The tongue jack mounting plate 40 and the attachment plate 42 are also further illustrated in front view in FIG. 5 and FIG. 6.

As previously discussed, it is convenient to arrange the latching device 60 such that it automatically moves into the latched position. The preferred embodiment of the invention utilizes a generally U-shaped bracket member 70 (FIG. 7) which is welded to the dolly tongue mounting plate 40 as the primary support for the automatic latching device 60. A first end 64 of the latching device 60 extends through the U-shaped bracket 70. A pin 72 extends transversely through the latching device 60. A spring 76 is held in compression between the U-shaped bracket 70 and the washer 74. In this configuration, the spring 74 automatically moves the latching device 60 into the latched position as cooperating pairs of holes in the tongue jack mounting plate 40 and the attachment plate 42 become coincident as the tongue support jack 30 is moved into the dolly tongue support position or into the trailer use position. The second end 62 of latching device 60 also includes a washer 80 welded to latching device 60 to form a stop for the second end 62 of the latching device 60 to limit its travel as it moves into locked position. The automatic locking device 60 is manually unlatched by pulling outward on the latching device 60 to compress the spring 76.

The tongue support mechanism is illustrated in FIG. 9 with the dolly tongue jack 30 extending downward in the tongue support position. Similarly, in FIG. 10, the tongue support jack 30 shown in the trailer use position. These two illustrations clearly show that the bolt 48 is positioned below the frame member 14 of the dolly and is offset from the major axis of the tongue jack 30. This arrangement assures that when the tongue jack 30 is in the trailer use position that the dolly tongue jack is substantially parallel to and slightly beneath the forward extending member 14 of the dolly frame. This positions the dolly tongue jack 30 such that the wheel attached to the dolly tongue jack 30 has sufficient road clearance. The road clearance is determined primarily by position of the axis about which the tongue jack support plate 40 is rotated. Other secondary factors which determine the road clearance include the diameter of the support wheel 31.

The tongue support mechanism can be constructed readily available materials and known construction techniques. For example, the dolly tongue jack support plate 42 can be constructed using half-inch plate steel. Suitable tongue support jacks are commercially available. The latching device can be fabricated using steel rod.

In the preferred embodiment, the tongue jack mounting plate 40 and the attachment plate 42 are approximately ten inches on each edge. Latching device 60 is fabricated using three-quarter inch steel rod. Mounting bolt 48 is a SAE one inch diameter steel bolt. The other components can either be obtained commercially or fabricated using commercially available materials.

Although the invention was developed primarily for use with trailer dollys, it is adaptable to other applications such as for use to support the tongues of conventional trailers.

I claim:

1. An improved trailer dolly comprising in combination:
   a. wheel and axle assembly;
   b. a frame assembly including a tongue;
   c. a tongue support assembly;
   d. means for attaching said tongue support assembly to said frame such that a tongue jack forming a part of said tongue support assembly is rotatable between a tongue support position and a trailer use position, said tongue support assembly also including a first substantially flat plate adapted for attaching to said tongue and having a plurality of holes therein a second substantially flat plate having a second plurality of holes therein adapted for mounting said tongue jack, means for rotatively attaching first plate to said second plate such that said first and second plates are substantially parallel to each other and are rotatable with respect to each other to position said plates in at least first and second angular positions with respect to each other such that a plurality of said first holes coincide with a plurality of said second holes and latching means including a U-shaped bracket having an open end affixed to said second plate, a latching device having at least first and second ends, at least one of said ends extending through an opening in said U-shaped bracket and spring means between the closed end of said U-shaped bracket and said latching device for moving said ends of said latching device into said coinciding plurality of holes for securing said first and second plates in at least said first and second positions corresponding to said coinciding holes.

2. An improved tongue jack comprising in combination:
   a. a trailer tongue support jack;
   b. means for coupling said tongue support jack to said tongue, said means for coupling including a first substantially flat plate adapted for attaching to said tongue, a second substantially flat plate adapted for mounting said tongue support jack, means for rotatably attaching said first plate to said second plate such that said first and said second plates are substantially parallel to each other and are rotatable with respect to each other to position said plates in at least first and second angular positions with respect to each other and latching means including a U-shaped bracket having a closed end substantially parallel to and spaced from said second plate with the ends of said U-shaped bracket affixed to said second plate, a latching means having first and second ends, at least one of said ends extending through said substantially parallel closed end of said U-shaped bracket and spring means between said substantially parallel closed end of said U-shaped bracket and said at least one of said ends of said latching means for moving the ends of said latching means into selectively coinciding pairs of holes in said first and second plates for distributing the forces necessary to selectively secure said first and second plates in said first and second positions with respect to each other to spaced apart positions corresponding to said coinciding holes in said first and second plates.

* * * * *